Patented Jan. 17, 1950

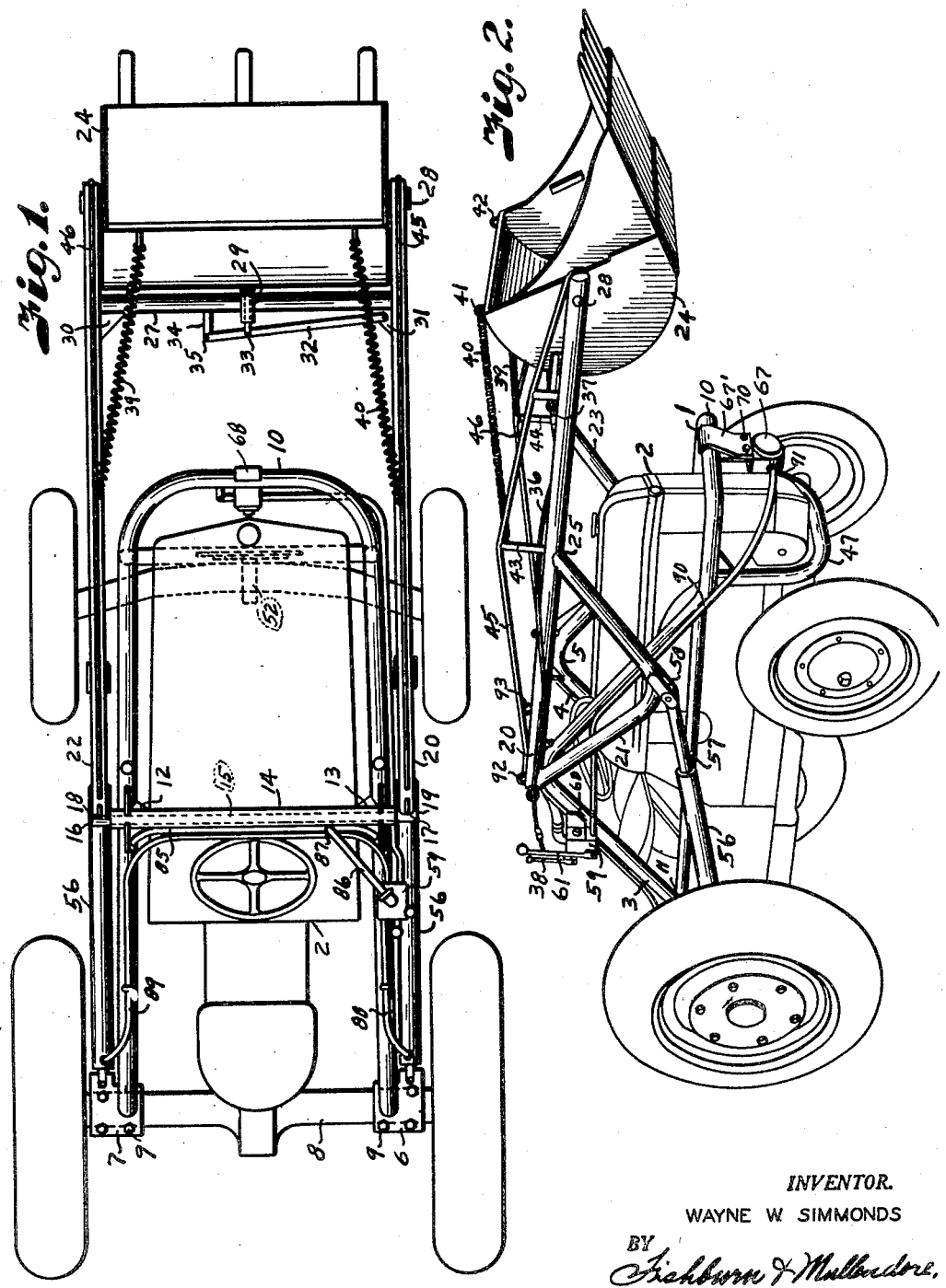

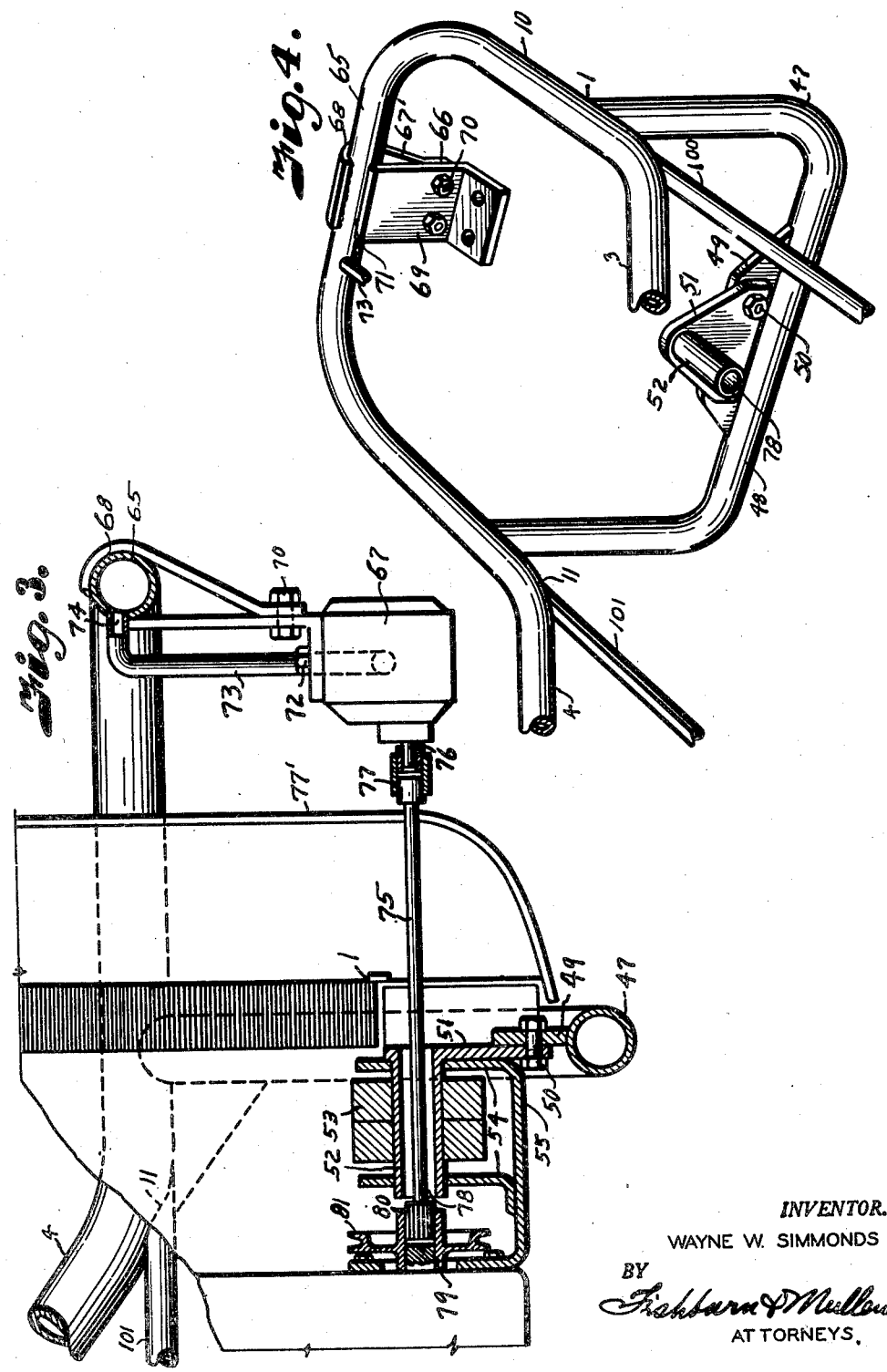

2,495,144

UNITED STATES PATENT OFFICE 2,495,144

FRAMEWORK STRUCTURE FOR POWER LIFTING ATTACHMENTS FOR VEHICLES

Wayne W. Simmonds, Kansas City, Mo., assignor, by mesne assignments, to Dearborn Motors Corporation, Detroit, Mich., a corporation of Delaware Application April 1, 1946, Serial No. 658,760

11 Claims. (Cl. 214—140)

1

This invention relates to a power lift attachment for tractors, and more particularly to a framework having a three-point suspension of such framework to a tractor or other vehicle.

Heretofore in attaching power lift devices to tractors it has been the practice to rigidly connect the framework of the device to the structure of the tractor at three or more points so that the tractor and the device were coupled together to constitute one unit. With this type of attachment, any strains and stresses produced by weaving of the framework of the device are transmitted to the tractor structure and vice versa; likewise, any deviation of the center of the load carried by the device from a true vertical position above the longitudinal center line of the tractor will cause an uneven distribution of such load on the tractor structure and will also tend to cause misalignment in the framework of the device.

The principal object of the present invention is to reduce the points of rigid connection between the device and the tractor to a minimum by providing but two such points in combination with a third point of pivotal connection so that the framework of the device and the tractor structure will act as independent units as far as possible. More specifically, the invention contemplates a pivotal connection between the front of the framework and forward portion of the tractor in combination with two rigid connections between the units at the rear.

Further objects of the present invention are to provide a framework structure whereby the tractor or other vehicle may be driven between the framework structure and the rear structure applied thereto by bolts or other fastening means and the front of the attachment mounted by pin and bearing members; to provide a framework structure whereby the rear end of the structure may be attached to the housing of the rear axle of a tractor or the like; to provide means on the forward portion of the framework structure having pivotal connection with the front end of the tractor; to provide means on the framework for supporting a pump for utilizing hydraulic means for the lifting mechanism of the framework structure; to provide a framework structure to serve as a fluid medium reservoir; to provide means for supporting the pump in alignment with the forward portion of the crank shaft of the motor of the tractor; to provide a shaft connecting the pump to the front end of the crank shaft for operating said pump; and to provide

2 a device of this character simple, economical to manufacture and efficient in operation.

Other objects of the invention are to provide a hollow framework structure for housing the fluid medium for operating the hydraulic cylinders of the structure; and to provide a pressure directly from the pump to the control valve, thence to the hydraulic cylinders to maintain a constant pressure on the fluid medium when the valve is open.

In accomplishing these and other objects of the present invention, I have provided improved details of structure, the preferred form of which is illustrated in the accompanying drawings, wherein:

Fig. 1 is a plan view of my framework structure showing the same applied to the rear axle housing of a tractor.

Fig. 2 is a side elevational view of the framework structure attached to a tractor and showing the load lifting means in elevated position.

Fig. 3 is an elevation view of a modified form of the invention partly in cross section showing the pivotal mounting of the framework structure on the tractor with the pump connected to the framework structure and with its shaft connected to the crank shaft of the motor.

Fig. 4 is a fragmentary perspective view of the front end of the framework particularly illustrating the pivotal mounting and the mounting for the pump.

Referring more in detail to the drawings:

I designates a framework structure embodying the features of my invention adapted to be attached to a tractor or the like 2. The main framework structure comprises a unitary U-shaped tubular element having tubular arm members 3 and 4 bent as indicated at 5 to substantially a V-shape and having their rear ends rigidly secured to brackets 6 and 7 adapted to be attached to the housing 8 of the rear axle of the tractor 2 as best illustrated in Fig. 1 by bolts or the like 9. The front portions of the tubular members 3 and 4 extend horizontally to form a U-shaped forward frame and cross member 10. Horizontal tubular members 100 and 101 are welded or otherwise secured to the members 3 and 4, respectively, as indicated at 11 (Figs. 2 and 3) to form triangular frame side members. The members 3, 4, 100 and 101 form a reservoir for a fluid medium for operating hydraulic rams or lifting means as later described.

Welded or otherwise rigidly secured to the top portions of the V-shaped bars 3 and 4 are brackets 12 and 13 to which is rigidly secured a tube or the like 14 having a shaft 15 rotatable therein and having its ends extending past the framework forming trunnions 16 and 17 adapted to receive bearing members 18 and 19 rigidly secured as by welding or the like to tubular members 20 and 21 and 22 and 23, respectively, on each side of the framework, forming a load lifting structure or boom members pivoted on said trunnions and adapted to carry a bucket or other load lifting means 24 as illustrated in Fig. 2. The tubular members 20 and 22 extend forwardly of the framework and the tubular members 21 and 23 are bent in substantially V-shape and have their forward ends rigidly secured to the forwardly extending members 20 and 22 as indicated at 25 (Fig. 2).

The bucket member 24 may be attached to the forwardly extending arms of the boom in the usual manner but the structure here shown consists of a cross bar 27 rigidly secured to the forwardly extending arms 20 and 22 and the bucket 24 is pivotally attached to the forward ends of the tubular members 20 and 22 by bolts or the like 28. The cross bar 27 carries latching means 29 for dumping the bucket member as is the usual practice. Brackets 30 and 31 are secured to the tubes 20 and 22 and to the cross member 27 also to strengthen the boom structure.

A lever 32 is pivotally connected to the latch means 29 as indicated at 33. A link 34 is rigidly attached to the cross bar 27 and pivotally connected to the lever 32 as indicated at 35. A rope or the like 36 has one end attached to the lever as indicated at 37 and its opposite end attached to a lever 38 carried by the frame at a location easily accessible to the operator of the device for dumping the load from the load carrying device after it is elevated to the desired position. Springs 39 and 40 having one end attached to the top of the load carrying means as indicated at 41 and 42 and their opposite ends to the struts 43 and 44 of guy members 45 and 46 are provided for swinging the load carrying device back to loading position and to latch the same in that position by the latching means 29. The guy members 45 and 46 are attached to the forward ends of the tube members 20 and 22 and to the brackets 12 and 13 to lend rigidity to the boom structure.

Rigidly secured to the forward U-shaped frame portion 10 and extending downwardly therefrom is a U-shaped tubular member or rod 47 having a horizontal cross bar portion 48. A lug or the like 49 is rigidly secured to the bar 48 by welding or other suitable means. The lug 49 is provided with openings adapted to receive bolts or the like 50 for attachment of a bracket member 51 to the lug 49. The bracket is substantially triangularly shaped and located near one vertex of the triangle is an opening in which is rigidly secured by welding or the like a tubular member or arm 52 adapted to be mounted through the front axle 53 of the vehicle which constitutes a bearing member. The arm 52 also extends through brackets 54 of a framework 55 of the tractor as best illustrated in Fig. 3. The arm 52 just described will provide a mounting for the front end of the framework structure to allow the front axle 53 to pivot on the arm 52 to cause the framework to remain in a horizontal position regardless of inclination of the tractor body when the front wheels of the tractor are driven over uneven ground as will later be shown. It will thus be seen that the weight of the load will be on the front and rear axles of the tractor instead of the body of the tractor.

Pivotally connected to the brackets 6 and 7 on the axle housing on each side of the tractor are cylinders 56 extending parallel with the framework structure and adapted to receive pistons 57 having their forward ends adapted to be pivotally connected to rearwardly extending brackets 58 rigidly connected to the lower portion of the V-shaped members 21 and 23 of the boom structure.

59 designates a control valve mounted upon member 3 of the main framework as indicated at 60 (Fig. 2) having a lever 61 for control of fluid for operating the pistons in the cylinders as later described.

Located substantially midway on the cross tube portion 65 of the U-shaped portion member 10 of the framework structure and adapted to be extended in front of the tractor is a support 66 for a pump 67 to supply pressure to the system through the control valve. The support 66 comprises an arm 67' having one end rounded as indicated at 68 to conform to the shape of the tube 65 and the arm is welded or otherwise rigidly secured to the tube. 69 designates an angle iron bracket member adapted to be secured to the bracket 67' by bolts 70 and its upper end rests against the tube framework as indicated at 71. The pump 67 is secured to the underneath side of the angle bracket member 69 by cap screws or the like 72. A line 73 for conducting fluid is connected to the pump and to the tubular framework structure as indicated at 74.

The supporting bracket member 66 is of a length to align the pump 67 with the crank shaft of the vehicle motor and with tubular supporting member 52 carried by the cross bar portion 48 on the U-shaped depending member 47 of the frame. A shaft 75 is connected to the shaft 76 of the pump by suitable connection 77 and the shaft is extended through an opening in the shell 77' of the radiator of the tractor and through the opening 78 of the tubular supporting member 52 and its opposite end is connected to the end of the crank shaft 79 by a spline or other suitable connection 80 extending through the fan pulley or sheave 81 as best illustrated in Fig. 3 so that upon operation of the motor of the tractor, the crank shaft will operate the pump 67 through the shaft 75. Since the shaft 75 extends through the tubular supporting member 52, a driving connection is established between the tractor engine and the hydraulic pump which is independent of any relative movement between the framework and the structure of the tractor.

The framework structure as previously described provides a reservoir for the fluid for operating the load lifting device and the following constitutes the fluid system for operating the device.

A line 85 is connected to the framework members 3 and 4 near the top thereof and extends along the tube 14 as best illustrated in Fig. 1 to provide a fluid connection between the top portions of each side of the framework structure. A line 86 has one end connected to the pipe 85 as indicated at 87 (Fig. 1) and its opposite end attached to the control valve 59. Conduits 88 and 89 having one end connected to the rear ends of the cylinders and their opposite ends attached to the control valve 59 provide means for supplying fluid to the cylinders from the control valve and returning the same thereto as will later be shown. A conduit 90 leads from the control valve 59 and is connected to the pump 67 as indicated at 91 (Fig. 2) for providing fluid under pressure from the pump to the control valve. The pipe 73 connecting between the framework reservoir as indicated at 74 and to the pump 67 provides for returning of fluid from the reservoir to the pump and also provides a complete working fluid system between the framework reservoir and pump.

The framework structure as above described may be mounted on the tractor by driving the tractor between the framework structure as shown by the U-shaped member 10 and the mounting pin 52 mounted in the frame of the tractor structure as shown in Fig. 3. The brackets 6 and 7 are then fastened to the rear axle housing. The shaft 75 is connected through the spline or other connection 80 with the crank shaft of the motor of the engine and to the shaft 76 of the pump 67 through the connection 77 so that the motor of the tractor and the pump will operate in unison. The top of the framework structure may be provided with rings or the like 92 and 93 for attachment of the device to a hoisting mechanism (not shown) for easy handling of the framework structure.

Operation of the device constructed and assembled as described is as follows:

The loading boom may be lowered through manipulation of the control lever 59 to lower the load carrying means 24 to the ground. Moving of the vehicle forward will cause the load carrying means to be loaded with whatever material is to be moved. When the load carrying means is loaded, operation of the lever on the control valve will open the valve so that fluid will flow from the pump 67 through conduit 90 to the control valve under pressure and thence from the control valve through conduits 88 and 89 to the rear portions of the hydraulic cylinders 56. The fluid still being under pressure will cause the pistons in the cylinders to move forwardly in the cylinders, and the forward ends of the plungers of the pistons having contact with the boom structure will cause the boom to pivot on its axis at the top of the framework structure to raise the load carrying means for transporting the load to the desired place, and then further pressure exerted on the fluid to cause raising of the load to the desired position. Then by operating the lever 38 the latching means 29 may be disengaged from the load carrying means through pull of the rope 36 to dump the load from the load carrying means. A keeper (not shown) is provided on the bottom of the bucket 24 so that when the bucket pivots to down position the latch 29 will engage the keeper and will hold the bucket in load dumping position to allow the load to be completely emptied therefrom. By again manipulating the lever 38 the latch will be released from the keeper on the bottom of the bucket, and the springs 39 and 40 attached to the top of the load carrying means and to the guy members 45 and 46 will cause the load carrying means to again assume its loading position and engage the latching means for further use. Release of the pressure on the cylinders by manipulation of lever 61 of the control valve 59 will cause the fluid to flow back through conduits 88 and 89 to the control valve and thence through lines 86 and 85 to the framework reservoir and from the framework reservoir through pipe 73 to the pump 67 for further use.

While I have here shown the load carrying means as a bucket or the like for handling solid materials, such as manure, dirt or the like, I do not wish to be limited to any particular load carrying means as it will be obvious any load carrying means will be adaptable for use with my load lifting apparatus.

What I claim and desire to secure by Letters Patent is:

1. A lifting attachment for a vehicle comprising, a frame readily applicable to and separable from the vehicle, means for attaching the rear of the frame to the rear of said vehicle, and means for pivotally mounting the front of said frame to the front portion of the vehicle, said last named means including a substantially U-shaped member depending from the frame having an upstanding bracket, said bracket supporting a pin longitudinally of the frame for pivotally engaging the axle of the vehicle.

2. A power lift attachment for an engine driven vehicle having a crankshaft and a bracket carried by the forward end of the vehicle having an aperture aligned with the crankshaft, comprising a frame readily applicable to and separable from the vehicle, means for attaching the rear of the frame to the rear of said vehicle, means for mounting the front portion of said frame to the forward end of the vehicle comprising a tubular mounting pin adapted to be positioned within said aperture of said bracket, and means for connecting said mounting pin to said frame, a boom articulated to said frame, load lifting means carried by said boom, hydraulic rams connected to said frame and to said boom, a self-contained hydraulic system including a pump carried by the forward end of said frame, means for driving said pump from the engine of said vehicle comprising a drive shaft adapted to extend through said mounting pin for connecting said pump to the crankshaft of said engine.

3. A lifting attachment for a vehicle comprising a frame readily applicable to and separable from the vehicle, means for attaching the rear of the frame to the rear of said vehicle and means for mounting the front of said frame to the front portion of the vehicle, said last-named means including a mounting pin adapted to pivotally engage the front axle of the vehicle, a substantially U-shaped member depending from said frame, and means for connecting said U-shaped member to said mounting pin.

4. A lifting attachment for a vehicle comprising a frame having a front cross member and side members extending rearwardly therefrom, each of said side members extending upwardly and downwardly to form an apex intermediate the front and rear ends of said frame, a cross member connecting said side members at the apexes thereof, pivot pins carried by said frame adjacent said apexes, boom members connected to said pivot pins and extending forwardly of said frame, a load carrying device pivotally attached to said boom members, a hydraulic cylinder positioned on each side of said frame and pivotally attached to the rear portion thereof and to each of said boom members, means for attaching the rear ends of said frame to said vehicle and means for mounting the front of said frame to the front portion of said vehicle, said last-named means including a substantially U-shaped cross member depending from said frame side members adjacent the front portions thereof, a tubular mounting pin adapted to be attached to said vehicle, means for attaching said U-shaped member to said mounting pin and a self-contained hydraulic system including a pump mounted below said front cross member of said frame and a drive shaft for said pump adapted to extend through said tubular mounting pin and into driving engagement with the engine of said vehicle.

5. In combination with a tractor vehicle having a frame and a front axle, a frame structure adapted to be detachably secured to the frame of said vehicle, a tubular mounting pin connecting said front axle to said frame on an axis parallel to the longitudinal center line of said vehicle, means for connecting said frame structure to said mounting pin, a power driven unit carried by said frame structure, and a drive shaft connecting said unit to the engine of said vehicle, said drive shaft extending through said tubular mounting pin.

6. A lifting attachment for a tractor having a front framework and front axle respectively provided with aligned longitudinally extending central apertures, comprising a generally U-shaped frame readily applicable to and separable from the tractor, means for attaching the free ends of said frame to the rear axle of said tractor, and means for mounting the front portion of said frame to the front axle of the tractor, said last named means including a substantially U-shaped depending portion of said frame adapted to surround the axis of said central apertures, and a longitudinally extending pin secured to said U-shaped depending portion and adapted to pivotally engage said central apertures, thereby pivotally securing the front axle to the tractor and mounting said frame on the front axle.

7. A lifting attachment for a tractor having a front framework and front axle respectively provided with aligned longitudinally extending central apertures, comprising a generally U-shaped frame readily applicable to and separable from the tractor, means for attaching the free ends of said frame to the rear axle of said tractor, and means for mounting the front portion of said frame to the front axle of the tractor, said last named means including a substantially U-shaped depending portion of said frame adapted to surround the axis of said central apertures and a longitudinally extending sleeve secured to said U-shaped depending portion and adapted to pivotally engage said central apertures, thereby pivotally securing the front axle to the tractor and mounting said frame on the front axle, a hydraulic pump, means mounting said pump on said frame, and means for driving said pump including a shaft passing through said sleeve.

8. A lifting attachment for a tractor having a front axle arranged to pivot in a vertical plane, comprising, a frame readily applicable to and separable from the tractor, means for attaching the rear of said frame to the rear axle of said tractor, a longitudinally extending pin mounting said front axle to the tractor for vertical pivotal movement, a plate rigidly secured to the front end of said pin, and means for detachably securing the front portions of said frame to said plate, thereby supporting said frame entirely on the tractor axles without stressing the tractor body.

9. A material handling device for attachment to a tractor having a body supported on front and rear axles, comprising a frame readily applicable to and separable from the tractor, said frame including a unitary tubular member bent into a generally U-shaped configuration adapted to surround the tractor body forwardly of the rear axle, means for detachably securing said tubular member to the tractor in surrounding relationship to the tractor body and with the bight portion of said tubular member disposed forwardly of the front end of the tractor body, the central portions of the arms of said U-shaped tubular member being respectively bent upwardly to define opposed vertices, a boom, and means for pivotally mounting said boom on said vertices of said tubular member.

10. A material handling device for attachment to a tractor having a body portion supported on front and rear axles, comprising a frame readily applicable to and separable from the tractor, said frame including a unitary tubing member bent into a generally U-shaped configuration adapted to surround all of the tractor body portion forwardly of the rear axle, means for detachably securing the free ends of said tubular member to spaced points on said tractor rear axle, means for detachably securing the forward portions of said tubular member to the front end of the tractor, the central portions of the arms of said tubular member being respectively bent upwardly to define opposed vertices, a boom, and means for pivotally mounting said boom on said vertices of said tubular member.

11. A material handling device for attachment to a tractor having a body portion supported on front and rear axles, comprising a frame readily applicable to and separable from the tractor, said frame including a unitary tubing member bent into a generally U-shaped configuration adapted to surround all of the tractor body portion forwardly of the rear axle, means for detachably securing the free ends of said tubular member to the rear portions of the tractor, a longitudinally extending pin adapted to pivotally engage the center of the tractor front axle, means for detachably securing said pin to the front portion of said tubular member, a boom and means on the central portions of the arms of said U-shaped tubular members for pivotally mounting said boom.

WAYNE W. SIMMONDS.

REFERENCES CITED

The following references are of record in the file of this patent:

UNITED STATES PATENTS

| Number | Name | Date |
|---|---|---|
| 1,443,768 | Stahl | Jan. 30, 1923 |
| 1,563,874 | Schmidt et al. | Dec. 1, 1925 |
| 1,820,855 | Whitehead | Aug. 25, 1931 |
| 2,059,150 | Schroeder | Oct. 27, 1936 |
| 2,079,695 | Patterson | May 11, 1937 |
| 2,334,374 | Austin | Nov. 16, 1943 |
| 2,385,512 | Heath | Sept. 25, 1945 |
| 2,391,857 | Arps et al. | Jan. 1, 1946 |
| 2,412,570 | Ender | Dec. 17, 1946 |

FOREIGN PATENTS

| Number | Country | Date |
|---|---|---|
| 159,287 | Switzerland | Mar. 1, 1933 |